United States Patent
Grigoryan et al.

(10) Patent No.: US 7,590,358 B2
(45) Date of Patent: Sep. 15, 2009

(54) OPTICAL REGENERATIVE AMPLIFIER FOR BINARY PHASE SHIFT-KEYING SIGNALS

(75) Inventors: Vladimir Grigoryan, 5227 Grovemont Dr., Elkridge, MD (US) 21075; Prem Kumar, 7727 Kildare Ave., Skokie, IL (US) 60076

(73) Assignees: Vladimir Grigoryan, Elkridge, MD (US); Prem Kumar, Skokie, IL (US)

(*) Notice: Subject to any disclaimer, the term of this patent is extended or adjusted under 35 U.S.C. 154(b) by 819 days.

(21) Appl. No.: 11/307,868

(22) Filed: Feb. 26, 2006

(65) Prior Publication Data
US 2006/0204248 A1 Sep. 14, 2006

Related U.S. Application Data

(60) Provisional application No. 60/656,987, filed on Feb. 28, 2005.

(51) Int. Cl.
*H04B 10/00* (2006.01)
(52) U.S. Cl. ........................ 398/175; 398/173
(58) Field of Classification Search .......... 398/173–181
See application file for complete search history.

(56) References Cited

U.S. PATENT DOCUMENTS

| | | | | |
|---|---|---|---|---|
| 3,838,278 A * | 9/1974 | Duguay et al. | ........ | 250/227.12 |
| 4,301,543 A * | 11/1981 | Palmer | ........ | 398/41 |
| 5,353,146 A | 10/1994 | Webb | | |
| 5,513,030 A | 4/1996 | Epworth | | |
| 5,596,661 A * | 1/1997 | Henry et al. | ........ | 385/24 |
| 5,657,154 A * | 8/1997 | Yoneyama | ........ | 359/337 |
| 5,781,326 A | 7/1998 | Chiaroni et al. | | |
| 5,798,852 A | 8/1998 | Billes et al. | | |
| 6,067,180 A | 5/2000 | Roberts | | |
| 6,636,661 B1 * | 10/2003 | Zeng | ........ | 385/24 |
| 6,804,434 B1 * | 10/2004 | Chandrasekhar et al. | ...... | 385/27 |
| 6,829,410 B1 * | 12/2004 | Zeng | ........ | 385/27 |
| 6,961,492 B2 * | 11/2005 | Doerr | ........ | 385/39 |
| 6,975,781 B2 * | 12/2005 | Takiguchi et al. | ........ | 385/3 |
| 7,085,438 B2 * | 8/2006 | Mizuno et al. | ........ | 385/3 |
| 7,200,299 B1 * | 4/2007 | Earnshaw | ........ | 385/17 |
| 7,203,427 B2 * | 4/2007 | Naik et al. | ........ | 398/175 |
| 7,369,779 B1 * | 5/2008 | Croussore et al. | ........ | 398/176 |
| 7,440,179 B2 * | 10/2008 | Laham et al. | ........ | 359/344 |
| 7,469,079 B2 * | 12/2008 | Nara et al. | ........ | 385/15 |
| 2001/0022678 A1 | 9/2001 | Leclerc et al. | | |
| 2002/0080453 A1 | 6/2002 | Leuthold et al. | | |
| 2002/0191259 A1 | 12/2002 | Otani et al. | | |

(Continued)

*Primary Examiner*—Agustin Bello

(57) ABSTRACT

There is provided an optical regenerative amplifier for regenerative amplification of a binary phase shift-keying (BPSK) sequence of optical signals having a predetermined time slot between any adjacent signals. The optical regenerative amplifier comprises a first delay interferometer, wherein an input sequence of BPSK signals is split between two arms of an interferometer, a relative delay by the time slot between the adjacent signals is introduced in one of the arms of the interferometer to produce two mutually anti-symmetric trains of amplitude shift-keying (ASK) signals; a discriminative limiting amplifier to amplify the said two trains of anti-symmetric ASK signals, wherein the amplification for the spaces is smaller compared to the amplification for the marks and the amplification for the marks is limiting; and a second delay interferometer, wherein the said two trains of anti-symmetric ASK signals are recombined, delayed, and interfered to reproduce a regeneratively amplified BPSK sequence of signals and to separate noise from the signals.

9 Claims, 3 Drawing Sheets

U.S. PATENT DOCUMENTS

| | | |
|---|---|---|
| 2003/0002117 A1* | 1/2003 | Naik et al. .................. 359/179 |
| 2003/0043484 A1 | 3/2003 | Shen et al. |
| 2003/0190167 A1 | 10/2003 | Simon et al. |
| 2004/0018020 A1 | 1/2004 | Chaput |
| 2004/0036946 A1* | 2/2004 | Webb et al. ................. 359/264 |
| 2004/0042800 A1 | 3/2004 | Lawrence |
| 2004/0131364 A1* | 7/2004 | Sartorius ..................... 398/175 |
| 2004/0207906 A1 | 10/2004 | DiJaili et al. |
| 2004/0208610 A1 | 10/2004 | Grosz et al. |
| 2005/0078350 A1 | 4/2005 | Prucnal et al. |
| 2005/0180758 A1 | 8/2005 | Seguineau et al. |
| 2006/0204248 A1* | 9/2006 | Grigoryan et al. ........... 398/161 |

* cited by examiner

OPTICAL REGENERATIVE AMPLIFIER FOR BINARY PHASE SHIFT-KEYING SIGNALS

RELATED APPLICATIONS

This application claims the benefit of provisional application Ser. No. 60/656,987 filed Feb. 28, 2005.

This invention was made at Northwestern University, Evanston, Ill. 60208, with government support under the following grant: DARPA-AFRL No. F 30602-01-2-0528/P00007. Both the Northwestern University and the government released their rights in this invention to the inventors.

BACKGROUND OF THE INVENTION

1. Field of the Invention

This invention is directed to regeneration of both amplitude and phase of optical binary phase shift-keying (BPSK) signals used in three areas: first, data communication by means of optical BPSK modulation format, second, data communication by means of optical quadrature phase shift-keying (QPSK) modulation format, wherein the BPSK signals constitute parts of the QPSK signals, and third, harmonically mode-locked lasers. In the BPSK signals the relative optical phase between the signals in adjacent time slots is either zero or $\pi$ radians, while the signal amplitudes in all the time slots are the same. The invention is applied to, in particular though not exclusively, optical signals comprising optical return-to-zero (RZ) pulses. It has application to both 2R (re-amplification and reshaping) and 3R (re-amplification, re-shaping, and re-timing) regeneration.

2. Technical Background

Optical 2R (re-amplification and re-shaping) and 3R (re-amplification, re-shaping, and re-timing) regenerators have been disclosed in the following patents: U.S. patent application No. 20050180758 by Seguineau et al, U.S. patent application No. 20050078350 by Prucnal et al, U.S. patent application No. 20040208610 by Grosz et al, U.S. patent application No. 20040207906 by Dijaili et al, U.S. patent application No. 20040042800 by Lawrence, U.S. patent application No. 20040036946 by Webb et al, U.S. patent application No. 20040018020 by Chaput, U.S. patent application No. 20030190167 by Simon et al, U.S. patent application No. 20030043484 by Shen et al, U.S. patent application No. 20020191259 by Otani et al, U.S. patent application No. 20020080453 by Leuthold et al, U.S. patent application No. 20010022678 by Leclerc et al, U.S. Pat. No. 6,067,180 by Roberts, U.S. Pat. No. 5,798,852 by Billes et al, U.S. Pat. No. 5,513,030 by Epworth, U.S. Pat. No. 5,353,146 by Webb, U.S. Pat. No. 5,781,326 by Chiaroni et al. All of the aforementioned patent applications and patents address optical regeneration of the amplitude of optical signal. However, these inventions are not able of regenerating relative optical phase of the transmitted signals. This type of regeneration is crucial for modern communication systems using phase shift-keying modulation format, for example, binary phase shift-keying, differential binary phase shift-keying, quadrature binary phase shift-keying, and differential quadrature binary phase shift-keying modulation formats. Consequently, the aforementioned inventions can not be used for regeneration of the phase shift-keying optical signals. Thus, there exists a demand for optical regenerator enabling regeneration of the phase of transmitted signal (along with its amplitude) in communication links.

The present invention enables simultaneous regeneration of optical phase and the amplitude of a transmitted signal.

SUMMARY OF THE INVENTION

According to the first aspect of the invention, there is provided an optical regenerative amplifier device for performing all-optical regeneration of optical BPSK sequence of signals (pulses). The BPSK signals may be parts of the QPSK signals (pulses) with at least two signals (pulses), wherein the relative phase between the adjacent pulses is either 0 or $\pi$ radian. In particular though not exclusively, the BPSK sequence of pulses represents a sequence of pulses with the same phases and the relative optical phase of zero radians between any two pulses in the sequence. The regenerative amplifier comprises three units. The first unit is a first delay interferometer, wherein a BPSK sequence of signals is converted into two mutually anti-symmetric ASK trains of signals. An asymmetric Mach-Zehnder interferometer can be used as the first delay interferometer. The second unit is a limiting optical amplifier, wherein the two anti-symmetric ASK trains of signals are amplifies in opposite directions to each other. A semiconductor optical amplifier can be used as the limiting optical amplifier. In this unit, an amplitude noise for marks (pulses) and spaces in both ASK trains of signals is suppressed due to the discriminative gain for the spaces relative to the marks (pulses) and the limiting amplification by the semiconductor optical amplifier. The third unit is a second delay interferometer, which is the first delay interferometer operating in the opposite direction, wherein the two said ASK trains of signals interfere and are converted to an output BPSK sequence of signals, in which both the phase and amplitude noise are reduced and the signal-to-noise ratio is improved.

The delay interferometer in the third unit may be a separate delay interferometer.

The said discriminative limiting amplifier can comprise two parallel semiconductor optical amplifiers, in each of which the fist of the said two mutually anti-symmetric trains of ASK signals is amplified in the direction opposite to the direction the second of the said two mutually anti-symmetric trains of ASK signals is amplified in.

Optical regenerative amplifier can be used for simultaneous regeneration of several binary phase shift-keying sequences of signals at different wavelengths without wavelength demultiplexing. Optical regenerative amplifier can be used in optical communication links including fiber, waveguide, and free space communications.

Optical regenerative amplifier can be also used in harmonically mode-locked lasers for improving the phase coherence of the output optical pulse trains.

According to a second aspect of the invention, there is provided a method of optical regenerative amplification of optical BPSK sequence of signals (pulses). The BPSK signals may be parts of the QPSK signals (pulses) with at least two signals (pulses), wherein the relative phase between the adjacent pulses is either 0 or $\pi$ radian. In particular though not exclusively, the BPSK sequence of pulses represents a sequence of pulses with the same phases and the relative optical phase of zero radians between any two pulses in the sequence. The optical regenerative amplification method comprises a three-step process. The first step comprises splitting of a sequence of BPSK signals (pulses) into two parts, a delay by the inter-pulse time slot in the BPSK pulse sequence, and a constructive and destructive interferences between the two parts of the BPSK signals resulting in two trains of mutually anti-symmetric ASK signals. The second step comprises a discriminative amplification of the two trains of mutually anti-symmetric ASK signals with the amplification for the spaces being smaller compared to the amplification for the marks (pulses). The third step comprises recombining of the two trains of mutually anti-symmetric ASK signals to re-produce a sequence of BPSK signals (pulses) with reduced phase and amplitude noise and increased signal-to-noise ratio relative to the input BPSK sequence of signals.

Additional features and advantages of the invention will be set forth in the detailed description which follows, and in part will be readily apparent to those skilled in the art from the description or recognized by practicing the invention as described in the written description and claims hereof, as well as the appended drawings. It is to be understood that both the foregoing description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention and together with the description serve to explain the principles and operation of the invention.

DETAILED DESCRIPTION OF THE PREFERRED EMBODIMENTS

The optical regenerative amplifier claimed in this invention enables regeneration of the relative optical phase of the transmitted signals by means of interfering the adjacent optical signals in a delay interferometer, suppressing the residual destructive interference product relative to the constructive interference product, and amplifying the constructive interference product in a limiting amplifier, thereby forcing the relative optical phase in any pair of optical signals to be either 0 or $\pi$ radian and equalizing the amplitudes of the optical signals. Therefore the present optical regenerative amplifier can be used for optical regeneration of the optical phase shift-keying signals.

Figure 1:
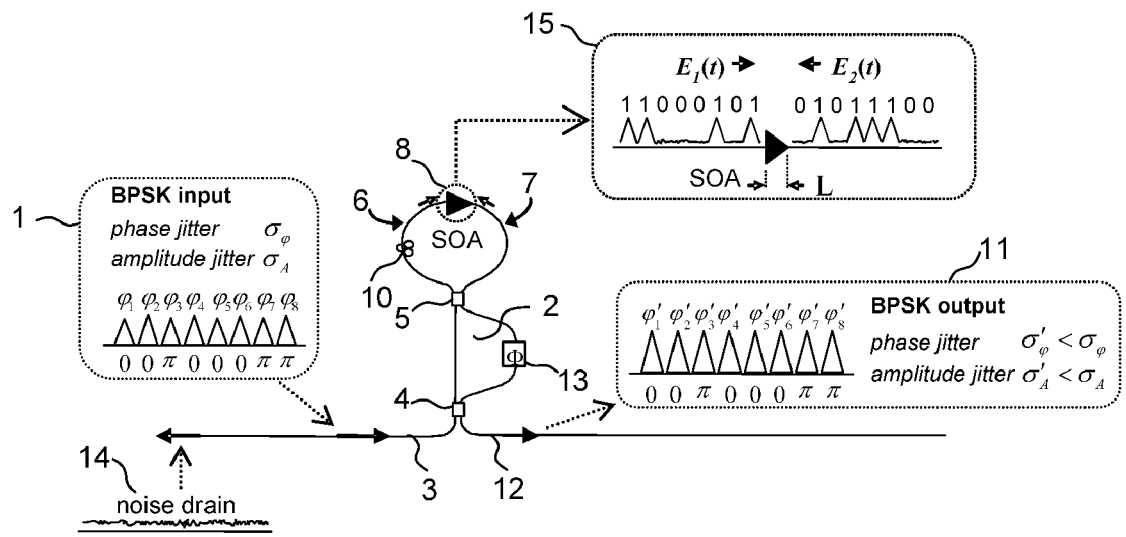
FIG. 1 is a schematic diagram of an optical regenerative amplifier. $\Phi$: phase bias; SOA: semiconductor optical amplifier; $\sigma_\varphi$: standard deviation of phase noise; and $\sigma_A$: standard deviation of amplitude noise.

FIG. 1 illustrates a device and method for performing all-optical regeneration of multiple signals comprising a sequence of optical BPSK signals (pulses). The BPSK signals may be parts of the QPSK signals (pulses) with at least two signals (pulses), wherein the relative phase between the adjacent pulses is either 0 or $\pi$ radian. In particular though not exclusively, the BPSK pulses represent a sequence of pulses 1 with the same phases when the relative optical phase between any two pulses in the sequence is zero radians. Such sequences of pulses are used in optical free space, fiber, and waveguide communications, and harmonically mode-locked lasers. In FIG. 1, a sequence of signals 1 enters the delay interferometer 2 through its input port 3. The input sequence of signals (pulses) 1 has a phase and an amplitude noise quantified by the standard deviation $\sigma_\varphi$ of the relative phase between the adjacent pulses and the standard deviation of the amplitude $\sigma_A$ respectively. The input sequence of signals 1 is split by a first 3 dB coupler 4 between the longer and the shorter arms of the delay interferometer 2. Due to the constructive and destructive interference at the second 3 dB coupler 5, two mutually anti-symmetric trains of amplitude shift-keying (ASK) signals in paths 6 and 7 are formed such that each time when a pulse (mark) is formed in the path 6, a space (filled with noise only) is formed in the path 7 and visa versa. The travel times of the pulses from the second coupler 5 to the SOA 8 through the paths 6 and 7 are the same. The ASK signals in the paths 6 and 7 enter the SOA 8 and are amplified in both directions. After being amplified by the SOA 8, the ASK signals re-enter the delay interferometer 2. The polarization controller 10 is set in such a way that a differential $\pi$ phase shift between the clockwise and counter-clockwise waves traveled through the paths 6 and 7 and arrived at the second coupler 5, is provided. After re-entering the delay interferometer 2 through the second coupler 5 and re-interfering at the first coupler 4, the ASK signals are converted back to a BPSK sequence of signals 11, which exits through the constructive interference port 12. The optical phase bias 13 is set to either 0 or $\pi$ radians. Part of the noise 14 is drained through the port 3 and separated from the signal 11, leaving less noise co-propagating with the signal 11 exiting through the port 12. The output sequence of signals 11 carries the same data as the input sequence of signals 1. However, the output signal sequence 11 has less phase and amplitude noise relative to the original signal sequence 1.

The SOA 8 of FIG. 1 can be constructed with an active region consisting of InGaAs quantum wells separated by InGaAs barriers (in different proportions) grown on InP. The delay interferometer can be an asymmetric Mach-Zehnder interferometer, either all-fiber or integrated interferometer, fabricated in a conventional manner with thermally controlled phase bias. The optical phase bias is set to either 0 or π radians. The polarization controllers 10 is set such that a differential π phase shift at the re-entering through the second coupler 5 between the clockwise and counter-clockwise waves, traveled in the paths 6 and 7, is provided.

The input sequence of signals 1 may be a BPSK sequence of signals or, alternatively, may be parts of the QPSK sequence of signals (pulses) with at least two signals (pulses), wherein the relative phase between the adjacent pulses is either 0 or π radian.

The key mechanism that enables the signal-to-noise ratio (SNR) improvement in the regenerative amplifier is the discriminative gain provided by the SOA 8 for the spaces versus the marks (pulses). When the ASK signals $E_1(t)$ and $E_2(t)$ enter the SOA 8, as shown in the inset 15 of FIG. 1, the spaces, which are filled only with the noise, always collide with their marks (pulses) counterparts. A mark (pulse) entering the SOA 8 in the clockwise direction through the path 6 reaches the left edge of the SOA 8 at the same time as its counterpart space, entering the SOA 8 through the path 7 in the counter-clockwise direction, reaches the right edge of the SOA 8. However, by the time the space, entering the SOA 8 through the path 7, reaches the left edge of the SOA 8, it encounters the material gain around the left edge of the SOA 8 that has been partially depleted by its mark (pulse) counterpart that traversed that area earlier by approximately the length L of the SOA 8 divided by the group velocity in the SOA 8. Meanwhile, the mark (pulse) undergoes more gain as its space counterpart causes negligible gain depletion everywhere within the length of the SOA 8. It is this differential gain that provides noise discrimination in the spaces relative to the marks (pulses). Concurrently, the saturated gain in the SOA 8 seen by the marks (pulses) tends to equalize their amplitudes, reducing their amplitude noise as well. Consequently the amplitude noise for both the ASK signals $E_1(t)$ and $E_2(t)$ passed through the SOA 8 is reduced both in spaces and marks (pulses). After re-entering the delay interferometer 2 through the second coupler 5, re-interfering at the first coupler 4, and converting to the sequence of signals 11, the reduced amplitude noise in the ASK signals $E_1(t)$ and $E_2(t)$ results in a reduced phase and amplitude noise for the sequence of signals 11 relative to the original signal sequence 1. Consequently, the standard deviations for the phase and amplitude noise $\sigma'_\phi$ and $\sigma'_A$ for the output BPSK sequence of signals 11 are smaller than the standard deviations for the phase and amplitude noise $\sigma_\phi$ and $\sigma_A$ for the original sequence of signals 1 respectively, that is $\sigma'_\phi < \sigma_\phi$ and $\sigma'_A < \sigma_A$. Therefore, the signal to noise ratio (SNR) of a sequence of signals passed through the regenerative amplifier in FIG. 1 is improved.

The input sequence of signals 1 can be a multi-channel wavelength division multiplexed (WDM) signal. The optical regenerative amplifier disclosed in FIG. 1 does not require any changes for operation for a multi-channel WDM signal. The channel spacing in the WDM signal must be a multiple of the free spectrum range of the delay interferometer.

Figure 2:
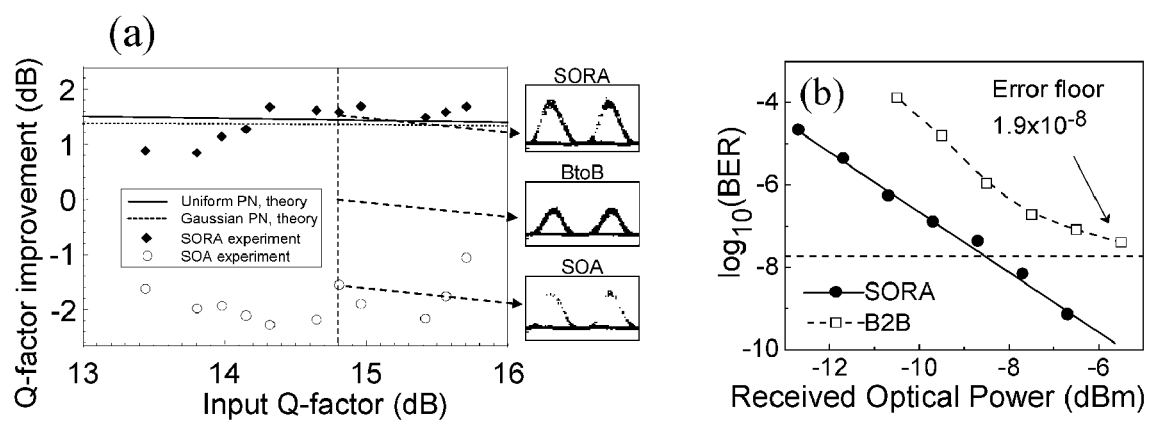
FIG. 2a is a set of two plots for Q-factor improvement measured at the output of the semiconductor optical regenerative amplifier (SORA) (filled diamonds) versus the input Q-factor for 10 Gb/s RZ BPSK data in a single channel operation regime at the wavelength of 1532.2 nm. For comparison, the open circles are the measurement results when only the SOA 8 in FIG. 1 is used straightforwardly (straight SOA) instead of the semiconductor optical regenerative amplifier to amplify the same RZ BPSK sequence of signals. Three eye diagrams, at the output of the SORA, at the input of the SORA (BtoB), and at the output of the straight SOA respectively are shown on the right for an input Q-factor of 14.8 dB.
FIG. 2b, filled circles are measurement results for the bit error ratio (BER) at the output of the semiconductor optical regenerative amplifier versus the received signal power, whereas the open squares are the BER measurement results at the input of the semiconductor optical regenerative amplifier (BtoB) for a fixed phase noise yielding a Q-factor of 14.8 dB at the BtoB.

FIG. 2(*a*) shows improvement of the Q-factor (measure of signal quality) for a sequence of RZ BPSK signals at the wavelength of 1532.2 nm and 10 Gb/s data rate, degraded due to the phase noise, measured at the output of the semiconductor optical regenerative amplifier (SORA) relative to the Q-factor measured at the input of the optical regenerative amplifier (filled diamonds) in the single channel operation. The input power of the RZ BPSK signal sequence was 3 dBm and the optical SNR was 30 dB. When only the SOA 8 is used straightforwardly (straight SOA 8) instead of the semiconductor optical regenerative amplifier to amplify the same RZ BPSK sequence of signals (open circles), the output-to-input Q-factor is degraded by up to 2.3 dB. However, the output-to-input Q-factor for the semiconductor optical regenerative amplifier (in which the same SOA 8 is used) is improved by 1.6 dB when the input Q-factor ≧14.3 dB, while the output power from the semiconductor optical regenerative amplifier is about 7 dBm. The power at the output of both the SORA and straight SOA 8 is the same. For an input Q-factor of 143.8 dB, the insets in FIG. 2(*a*) also show the eye-opening improvement obtained at the output of the SORA (SORA eye-diagram) relative to the eye-opening at the input of the of the SORA (BtoB eye-diagram)) and significant improvement relative to the straight SOA 8 (SOA eye-diagram). FIG. 2(*a*) shows also comparison of the modeling results for the Q-factor improvement with the measured Q-factor improvement for two types of noise statistics: uniform-distributed phase (solid line) and Gaussian-distributed phase noise (dotted line). There is a good agreement between the model and the measurement results for the input Q-factors>14 dB and a reasonable agreement for Q-factors<143 dB. The modeling results only slightly depend on the phase noise statistics: the difference between the cases of uniform- and Gaussian-distributed phase noise is within 0.13 dB.

The signal quality improvement is manifested by the bit-error ratio (BER) improvement in FIG. 2(*b*), which shows the measured BER versus the received signal power (changed by use of a variable optical attenuator) for a fixed phase noise yielding a Q-factor of 143.8 dB at the input of the semiconductor optical regenerative amplifier (BtoB). Although when measured with a perfect detector, the optical regeneration process cannot improve the BER over a signal's original BER, for practical error-detection systems ruled by nonlinear decision circuits, an improvement of BER can be observed. In FIG. 2(*b*), the BER at the input of the semiconductor optical regenerative amplifier tends to floor at $1.9 \times 10^{-8}$, in accord with its 143.8 dB Q-factor, whereas the BER at the output of the semiconductor optical regenerative amplifier continues to drop below $10^{-9}$ resulting in the BER improvement reaching 2 orders of magnitude for the same receiver.

Figure 3:
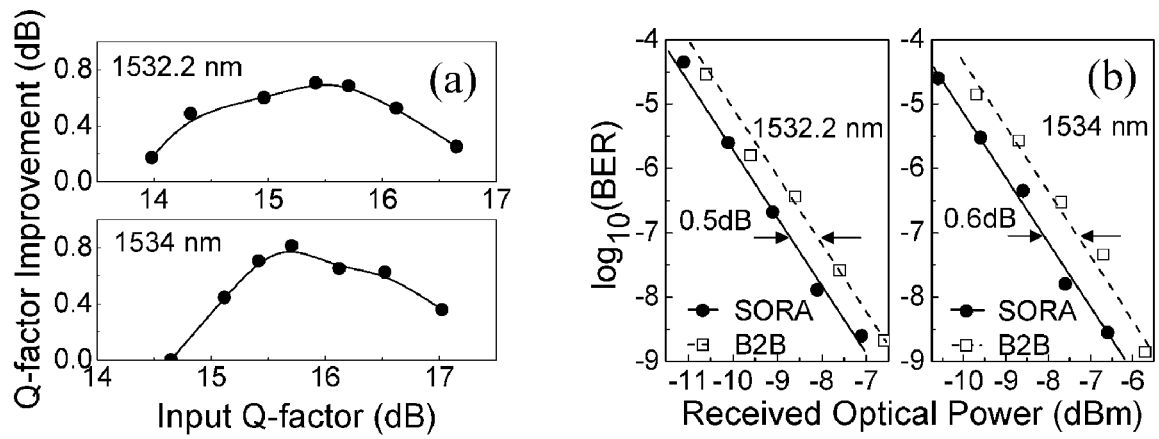
FIGS. 3a and 3b are measurement results for the Q-factor improvement versus the input Q-factor and the BER versus the received optical power respectively for dual channel operation regime by the semiconductor optical regenerative amplifier for two mutually de-correlated sequences of RZ BPSK signals at the wavelengths of 1532.2 nm and 1534 nm and 10 Gb/s data rate for each channel.

A dual channel operation regime by the semiconductor optical regenerative amplifier is illustrated by FIG. 3 for two mutually de-correlated sequences of RZ BPSK signals at the wavelengths of 1532.2 nm and 1534 nm and 10 Gb/s data rate for each channel, degraded due to the phase noise. FIG. 3(*a*) shows the maximum improvement of the Q-factor of 0.7 dB (0.8 dB) for the signal at 1532.2 nm (1534 nm) when the input Q-factor ranges from 14 dB to 17.5 dB. The BER measurements in FIG. 3(*b*) show the BER improvement by 0.7 (0.8) orders of magnitude and a −0.5 dB (−0.6 dB) negative power penalty for the output of the semiconductor optical regenerative amplifier vs. its input (BtoB), thus demonstrating a capability of the semiconductor optical regenerative amplifier of regenerating two WDM channels simultaneously. However, the magnitude of the improvement for each channel is reduced relative to the single channel case due to the cross gain modulation caused by the neighboring channel.

Figure 4:
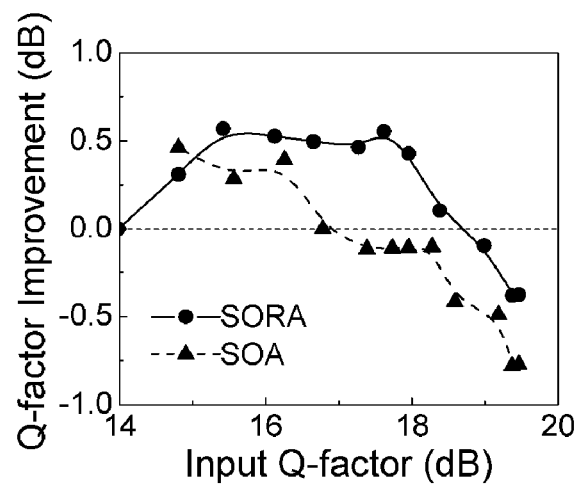
FIG. 4 is the plot of measured Q-factor improvement for a sequence of RZ BPSK signals at 10 Gb/s data rate, degraded due to a broad band amplified spontaneous emission (ASE) noise, measured at the output of the semiconductor optical regenerative amplifier (SORA) relative to the Q-factor measured at the input of the SORA for a single channel operation regime at the wavelength of 1532.2 nm. Filled triangles are the Q-factor improvement measured when only the SOA 8 is used straightforwardly instead of the semiconductor optical regenerative amplifier, to amplify the same RZ BPSK sequence of signals.

FIG. 4 shows the Q-factor improvement for a sequence of RZ BPSK signals at the wavelength of 1532.2 nm at 10 Gb/s data rate, degraded due to a broad band amplified spontaneous emission (ASE) noise, measured at the output of the semiconductor optical regenerative amplifier (SORA) relative to the Q-factor measured at the input of the optical regenerative amplifier in the single channel operation regime (filled circles, SORA). For the sake of comparison, the Q-factor improvement, when only the SOA 8 is used straightforwardly instead of the semiconductor optical regenerative amplifier, to amplify the same RZ BPSK sequence of signals, (filled triangles, SOA) is shown. The measurements show up to 0.55 dB Q-factor improvement for the semiconductor optical regenerative. This improvement is smaller compared to the Q-factor improvement of 1.6 dB for the case when the RZ BPSK sequence of signals is degraded by the phase noise. However, the inventors have found that by filtering out the broad ban ASE noise outside the bandwidth of the RZ BPSK sequence of signals (out-of-band ASE noise) before sending the sequence of signals to the semiconductor optical regenerative, the Q-factor improvement increases to 1.6 dB and above.

Figure 5:
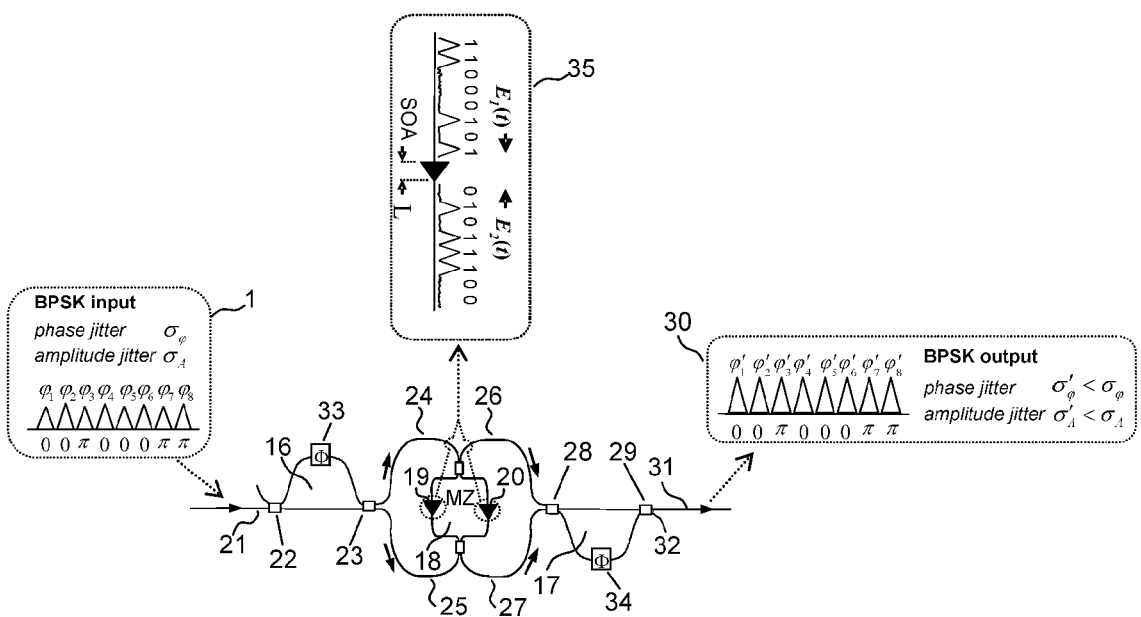
FIG. 5 is a schematic diagram of an alternative embodiment of an optical regenerative amplifier according to the invention, wherein two delay interferometers and two semiconductor optical amplifiers (SOA) are used. $\Phi$: phase bias; $\sigma_\varphi$: standard deviation of phase noise; and $\sigma_A$: standard deviation of amplitude noise.

FIG. 5 shows a second embodiment of a regenerative optical amplifier according to the invention. This embodiment comprises a first 16 and a second 17 delay interferometers. A symmetric Mach-Zehnder (MZ) interferometer 18 is located between the first and the second delay interferometers 16 and 17. Two SOA's 19 and 20 are placed in two arms of the Mach-Zehnder (MZ) interferometer 18.

In this embodiment, an input sequence of signals 1 enters the first delay interferometer 16 through its input port 21. The input sequence of signals 1 has a phase and an amplitude noise quantified by the standard deviation $\sigma_\phi$ of the relative phase between the adjacent signals and the standard deviation of the amplitude $\sigma_A$ respectively. The input signal sequence 1 is split by a first 3 dB coupler 22 between the longer and the shorter arms of the delay interferometer 16. Due to the constructive and destructive interference at the second 3 dB coupler 23, two mutually anti-symmetric trains of ASK signals are formed, with the first train of ASK signals traveling through the path 24 and the second train of ASK signals traveling through the path 25, such that each time when a pulse (mark) is formed on the path 24, a space (filled with noise only) is formed on the path 25 and visa versa. The trains of ASK signals traveling through the paths 24 and 25 enter the MZ 18 in which they split between two arms of the MZ 18 and are amplified by the first and second SOA 19 and 20 in mutually opposite (upstream and downstream) directions. After the splitting and passing through the first and the second SOA 19 and 20 and interference at the exit of the MZ 18 in either upstream or downstream direction, each of the ASK trains of signals is recombined on the paths 26 and 27. The ASK train of signals that entered the MZ 18 through the path 25 in the upstream direction is recombined on the path 26 whereas the ASK train of signals that entered the MZ 18 through the path 24 in the downstream direction is recombined on the path 27. The ASK trains of signals on the path 26 and 27 enter the second delay interferometer 17 through the third coupler 28. In the second delay interferometer 17, after the delay and interference at the forth coupler 29, the ASK trains of signals are converted back to a sequence of signals 30, which exits through the constructive interference port 31. Part of the noise is drained through the port 32 and separated from the sequence of signals 30, leaving less noise co-propagating with the sequence of signals 30 exiting through the port 31. The output sequence of signal 30 carries the same data as the input sequence of signals 1. However, the output sequence of signals 30 has less phase and amplitude noise relative to the original sequence of signals 1. The phase bias 33 in the first delay interferometer 16 is set to either 0 or $\pi$ radian. The phase bias 34 in the second delay interferometer 17 is set to 0 radian.

When the phase bias 34 in the second delay interferometer 17 is set to $\pi$ radian, then the output ports 31 and 32 interexchange.

In the second embodiment shown in FIG. 5, the key mechanism that enables the SNR improvement in the regenerative amplifier is the discriminative gain provided by each of the first and the second SOA 19 and 20 in the MZ 18 for the spaces versus the marks (pulses). When each of the trains of the ASK signals $E_1(t)$ and $E_2(t)$ enter both the first and the second SOA 19 and 20 in the downstream and upstream direction respectively, as shown in the inset 35 of FIG. 5, the spaces, which are filled only with the noise, always collide with their marks (pulses) counterparts. A mark (pulse), entering each of the first and the second SOA 19 and 20 in the downstream direction through the path 24 reaches the upper edge of each of the first and the second SOA 19 and 20 at the same time as its counterpart space entering each of the first and the second SOA 19 and 20 through the path 25 in the upstream direction reaches the lower edge of each of the first and the second SOA 19 and 20. However, by the time the space, entering each of the first and the second SOA 19 and 20 through the path 25 in the upstream direction reaches the upper edge of each of the first and the second SOA 19 and 20, it encounters the material gain around the upper edge of each of the first and the second SOA 19 and 20 that has been partially depleted by its mark (pulse) counterpart that traversed those areas earlier by approximately the length L of the SOA 19 and 20 divided by the group velocity in the SOA 19 and 20. Meanwhile, the mark (pulse) undergoes more gain as its space counterpart causes negligible gain depletion everywhere within the length of each of the first and the second SOA 19 and 20. It is this differential gain that provides noise discrimination in the spaces relative to the marks (pulses). Concurrently, the saturated gain in each the first and the second SOA 19 and 20 seen by the marks (pulses) tends to equalize their amplitudes, reducing their amplitude noise as well. Consequently the amplitude noise for both the ASK trains of signals $E_1(t)$ and $E_2(t)$ passed through the first and the second SOA 19 and 20 is reduced both in spaces and marks (pulses). After passing through the first and the second SOA 19 and 20 (in each direction, upstream or downstream) and interference at the exit of the MZ 18, each of the ASK trains of signals is recombined in the paths 26 and 27. The ASK signal train that entered the MZ 18 through the path 25 in the upstream direction is recombined in the path 26 whereas the ASK signal train that entered the MZ 18 through the path 24 in the downstream direction is recombined in the path 27. The ASK trains of signals in the path 26 and 27 enter the second delay interferometer 17 through the third coupler 28. In the second delay interferometer 17, after the delay and interference at the forth coupler 29, the ASK rains of signals are converted back to a sequence of signals 30, which exits through the constructive interference port 31. Part of the noise is drained through the port 32 and separated from the sequence of signals 30, leaving less noise co-propagating with the sequence of signals 30 exiting through the port 31. The output sequence of signals 30 carries the same data as the input sequence of signals 1. However, the output signal sequence 30 has less phase and amplitude noise relative to the original signal sequence 1. Consequently, the standard deviations for the phase and amplitude noise $\sigma'_\phi$ and $\sigma'_A$ for the output sequence of signals 30 are smaller than the standard deviations for the phase and amplitude noise $\sigma_\phi$ and $\sigma_A$ for the original sequence of signals 1, $\sigma'_\phi < \sigma_\phi$ and $\sigma'_A < \sigma_A$. Therefore, the signal to noise ratio (SNR) of a sequence of signals passed through the regenerative amplifier in FIG. 2 is improved.

The SOA's 19 and 20 of FIG. 5 can be constructed with an active region consisting of InGaAs quantum wells separated by InGaAs barriers (in different proportions) grown on InP. Each of the delay interferometers 16 and 17 can be an asymmetric Mach-Zehnder interferometer, either all-fiber or integrated interferometer, fabricated in a conventional manner with thermally controlled phase bias.

The optical regenerative amplifier claimed in this invention can be used for generating highly coherent trains of optical pulses in harmonically mode-locked lasers, wherein the phases of all the optical pulses in the trains are the same and, hence, the relative phase between any two pulses is 0 radian. In order to achieve this, the free spectrum range of the delay interferometer in the optical regenerative amplifier claimed in this invention must be set to the repetition rate of the harmonically mode-locked laser. The optical regenerative amplifier claimed in this invention can be used either inside or outside the cavity of the harmonically mode-locked laser.

The optical regenerative amplifier claimed in this invention represents a 2R regenerator. Alternatively, a regenerator comprising an either the first (FIG. 1) or the second ((FIG. 5) embodiment of the invention and a clock stream fed to the SOA 8 in FIG. 1 or to both SOA's 19 and 20 in FIG. 5, may be used for 3R regeneration.

It will be apparent to those skilled in the art that the fundamental principles as defined by the appended claims may be applied to other regenerator embodiments not specifically described herein. Furthermore, it will be clear that various modifications to the preferred embodiments of the invention as described herein can be made without departing from the spirit or the scope of the invention as defined by the appended claims.

What is claimed is:

1. An optical regenerative amplifier for regenerative amplification of a binary phase shift-keying sequence of signals having a predetermined time slot between any adjacent signals comprising:
   (i) a first delay interferometer, wherein an input sequence of signals is split between two arms of the interferometer,
   a relative delay by the time slot between the adjacent signals being introduced in one of the arms of the interferometer,
   the first delay interferometer outputting a first and a second trains of amplitude shift keying signals, the first train being anti-symmetric to the second train, the amplitude shift keying signal consisted of marks and spaces;
   (ii) a discriminative limiting amplifier amplifying the first and the second trains of anti-symmetric amplitude shift keying signals, wherein the discriminative amplifier performing amplification for the spaces being smaller compared to the amplification for the marks and the amplification for the marks being limiting;
   (iii) a second delay interferometer, wherein the second delay interferometer is identical to the first delay interferometer.

2. An optical regenerative amplifier according to claim 1, wherein the second delay interferometer is the first delay interferometer operating in the opposite direction relative to the operation direction of the first interferometer.

3. An optical regenerative amplifier according to claim 2, wherein the discriminative limiting amplifier comprises a semiconductor optical amplifier, the amplifier performing amplification of the first train in a first direction being opposite to a second direction of a second train amplification.

4. An optical regenerative amplifier according to claim 1, wherein the discriminative limiting amplifier comprises a first and a second semiconductor optical amplifiers, the first and the second semiconductor optical amplifiers being positioned in parallel, the first and the second semiconductor amplifiers each performing amplification of both the first and the second trains, wherein the amplification of the first train is performed in a first direction being opposite to a second direction of the second train amplification.

5. An optical regenerative amplifier according to claim 1, wherein the said first delay interferometer comprises an asymmetric Mach-Zehnder interferometer.

6. An optical regenerative amplifier according to claim 1, wherein the binary phase shift-keying sequence of signals comprises several binary phase shift-keying sequences of signals at different wavelengths, that several sequences of signals being simultaneously regeneratively amplified without wavelength demultiplexing.

7. An optical regenerative amplifier according to claim 1 or 2, wherein the optical regenerative amplifier is used in optical communication links including fiber, waveguide, and free space communications.

8. An optical regenerative amplifier according to claim 1 or 2, wherein the optical regenerative amplifier is used in a harmonically mode-locked laser for improving a phase coherence of a laser output optical pulse train.

9. A method of optical regenerative amplification for a binary phase shift-keying sequence of signals having a predetermined time slot between any adjacent signals in the sequence comprising three steps of:
   (i) causing an input sequence of signals to split into a first part and a second part, delaying the first part relative to the second part by the time slot, interfering the first and the second parts to produce two mutually anti-symmetric trains of amplitude shift keying signals, each amplitude shift keying signal consisted of marks and spaces;
   (ii) discriminatively amplifying said two trains of anti-symmetric amplitude shift keying signals, wherein an amplification for the spaces being smaller compared to the amplification for the marks and the amplification for the marks being limiting;
   (iii) causing said two trains of anti-symmetric amplitude shift keying signals to recombine, delay, interfere, producing a binary phase shift-keying sequence of signals with a reduced noise, and separate a part of the noise from the binary phase shift-keying sequence of signals.

* * * * *